A. A. McPHEETERS.
SUPERFLOOR STRUCTURE.
APPLICATION FILED JULY 8, 1918.

1,341,187. Patented May 25, 1920.

Witnesses.
Inventor
A. A. McPheeters
By
Attorneys

UNITED STATES PATENT OFFICE.

ADAM A. McPHEETERS, OF CANANEA, MEXICO.

SUPERFLOOR STRUCTURE.

1,341,187.   Specification of Letters Patent.   Patented May 25, 1920.

Application filed July 8, 1918. Serial No. 243,776.

*To all whom it may concern:*

Be it known that I, ADAM A. MCPHEETERS, a citizen of the United States, residing at Cananea, State of Sonora, Mexico, have invented certain new and useful Improvements in Superfloor Structures; and I do hereby declare the following to be a full, clear, and exact description of the invention, such as will enable others skilled in the art to which it appertains to make and use the same.

The invention relates to a floor construction, and more especially to the class of superfloors for leaching tanks or the like used in handling ore.

The primary object of the invention is the provision of a superfloor of this character wherein the same can be readily placed within the leaching tank and in the use thereof will assure a free circulation of the solution used for treating the ore so that said solution will pass through the body of pulverized ore without any possibility of interruption to its circulation during the leaching process.

Another object of the invention is the provision of a superfloor of this character wherein the construction thereof is novel in form, having channels and apertures intersecting the same so that the solution within the leaching tank or the like will be directed into the body of the ore being treated throughout the mass thereof, thus a thorough circulation of the solution will be had within the body of ore for the successful leaching thereof.

A further object of the invention is the provision of a floor structure of this character which will be prevented from clogging and thereby interrupting or choking the circulation of the solution in the leaching process of the ore, thus eliminating any possibility of interference of circulation of said solution from the bottom of the ore tank or the like into the body of the ore therein.

A still further object of the invention is the provision of a floor structure of this character which is extremely simple in construction, thoroughly reliable and efficient in its purpose, durable, and inexpensive to manufacture and install.

With these and other objects in view, the invention consists in the features of construction, combination and arrangement of parts, as will be hereinafter fully described, illustrated in the accompanying drawing, and pointed out in the claims hereunto appended.

In the accompanying drawing:—

Similar reference characters indicate corresponding parts throughout the several views in the drawing.

Figure 1:
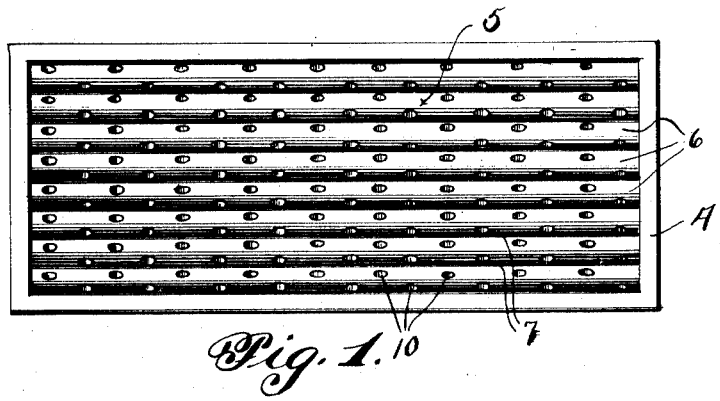
Figure 1 is a top plan view of an ore leaching tank showing the superfloor structure therein constructed in accordance with the invention.

Referring to the drawing in detail, A designates generally an ore leaching tank or the like which is of conventional form and is adapted to contain a leaching solution for the treatment of pulverized ore when placed therein.

Arranged interiorly of the tank A on the bottom thereof is a superfloor comprising a body 5 preferably made from wood although the same may be made from a composition. This body is formed at its top with a plurality of longitudinal parallel rows of ribs or corrugations 6 which are of relatively wide and gently arched formation with shallow grooves or channels 7 therebetween, while formed at the bottom of said body are longitudinal parallel rows of ribs 8 which are relatively narrow and have flat parallel side faces spaced considerably from each other to leave between them deep channels 9, the channels 9 being located immediately below the upper ribs or corrugations 6, while the lower ribs 8 are located immediately below the channels 7 so that the two sets of ribs are in staggered relation, said channels 9 forming ways or passages for the leaching solution which is pumped or otherwise forced into the tank A at the bottom thereof, the solution being circulated in the tank A through the superfloor in a manner presently described.

Figure 2:
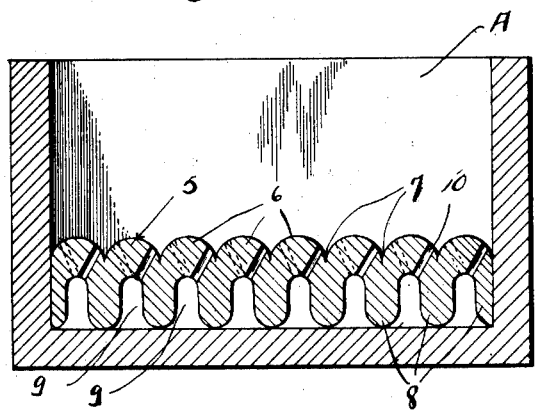
Fig. 2 is a vertical transverse sectional view through the tank and superfloor.
Figure 4:
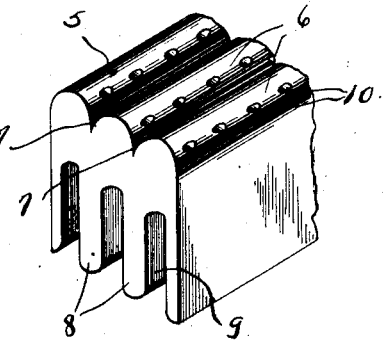
Fig. 4 is a fragmentary perspective view showing a portion of the superfloor.
Figure 3:
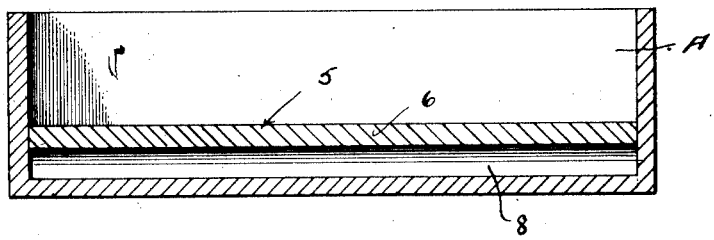
Fig. 3 is a vertical longitudinal sectional view.

Formed in the body 5 and opening into the channels 9 and through the upper ribs or corrugations 6 at opposite sides of their transverse centers into the channels 7 are apertures or holes 10. These holes by preference are arranged in two rows or series for each corrugation 6, the holes of one row extending obliquely from the top of the lower channel 9 into the upper channel 7 at one side of the corrugation, and the holes of the other row extending from said lower channel to the upper channel at the other side of the corrugation, inclining in the other direction as indicated by dotted lines in Fig. 2, and being alternated or staggered with respect to the holes of the first row as seen in Fig. 1. This arrangement is purposely adopted so that the solution flowing through the ways formed by the channels 9 is distributed upwardly through the holes 10 into the mass of pulverized ore supported upon the superfloor. In the event that any particles of the ore work through the holes 10 into the lower channels 9 the solution under pressure will force the same upwardly to the upper surface of the superfloor, thus preventing congestion or choking of the lower channels and a free and regular circulation is assured in the leaching tank.

The ore to be treated for the leaching thereof is in pulverized form and is placed within the tank A to be supported by the superfloor structure, while the solution is contained within the lower portion of said tank beneath the superfloor and is subjected to pressure from a pump or the like, the solution being forced through the channels 9 and the same will circulate upwardly through the holes 10 to be caused to circulate through the ore mass with maximum force to impregnate the mass of ore in the treatment thereof. The wet mass of ore resting upon the superfloor prevents any dry ore from working its way through the holes 10 in refilling tank into the channels 9 in the superfloor and thus choking or clogging the circulation of the leaching solution.

It is of course to be understood that changes, variations and modifications may be made in the invention such as come properly within the scope of the appended claims should it be found necessary, without a departure from the spirit of the invention or sacrificing any of its advantages. It will be obvious that the circulation will be more rapid through the holes and thus leaching the ore in a shorter period of time, while the channels 9 provide an even distribution of the solution throughout the mass of ore, thereby insuring greater values from said ore which has been leached.

From the foregoing it is thought that the construction and operation of the invention will be clearly understood, and therefore a more extended explanation has been omitted.

What is claimed is:—

1. A superfloor structure of the character described whose upper face is formed with parallel rows of gently arched corrugations with shallow channels between them, whose lower face is formed with parallel rows of ribs having deep channels between them, and whose body has holes extending obliquely therethrough from each lower channel to the two nearest upper channels.

2. A superfloor structure of the character described whose upper face is formed with parallel rows of corrugations with shallow channels between them, whose lower face is formed with parallel rows of ribs respectively opposite said channels and having deep channels between them, the walls of said channels being flat and parallel, and whose body has holes extending obliquely therethrough from each lower channel to the two nearest channels.

3. A superfloor structure of the character described whose upper face is formed with parallel rows of corrugations with interposed shallow channels, whose lower face is formed with parallel rows of ribs with interposed deep channels, the channels of one face being in alternated relation to those of the other, and whose body is formed with holes extending from each lower channel to the two nearest upper channels, said holes being in two rows, oppositely inclined, and in staggered relation to each other.

In testimony whereof, I affix my signature, in the presence of two witnesses.

ADAM A. McPHEETERS.

Witnesses:
J. P. ALVES,
E. J. LODD.